US008515985B1

(12) United States Patent
Zhou (10) Patent No.: US 8,515,985 B1
(45) Date of Patent: Aug. 20, 2013

(54) SEARCH QUERY SUGGESTIONS (75) Inventor: Yun Zhou, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/168,799

(22) Filed: Jun. 24, 2011

(51) Int. Cl.
G06F 17/30 (2006.01)
(52) U.S. Cl.
USPC .......................................... 707/767
(58) Field of Classification Search
USPC ................. 707/767, 766, 201, 759, 708, 769, 707/805, 765, 768; 709/201
See application file for complete search history.

(56) References Cited

U.S. PATENT DOCUMENTS

| | | | | |
|---|---|---|---|---|
| 6,954,750 B2 * | 10/2005 | Bradford | ............................... | 1/1 |
| 8,086,619 B2 * | 12/2011 | Haahr et al. | ................... | 707/765 |
| 8,290,810 B2 * | 10/2012 | Ramer et al. | ................. | 705/7.32 |
| 8,298,087 B1 * | 10/2012 | Smith | ............................. | 463/42 |
| 8,301,125 B2 * | 10/2012 | Ramer et al. | ................ | 455/414.1 |
| 8,364,540 B2 * | 1/2013 | Soroca et al. | ............... | 705/14.64 |
| 2005/0055341 A1 * | 3/2005 | Haahr et al. | ...................... | 707/3 |
| 2007/0106658 A1 * | 5/2007 | Ferrari et al. | ...................... | 707/5 |
| 2008/0140643 A1 * | 6/2008 | Ismalon | ........................... | 707/5 |
| 2012/0275642 A1 * | 11/2012 | Aller et al. | ..................... | 382/100 |
| 2012/0282905 A1 * | 11/2012 | Owen | ........................ | 455/414.1 |
| 2012/0282911 A1 * | 11/2012 | Davis et al. | .................. | 455/418 |
| 2012/0284012 A1 * | 11/2012 | Rodriguez et al. | ................ | 704/1 |
| 2013/0011062 A1 * | 1/2013 | Conwell et al. | ............... | 382/173 |

* cited by examiner

Primary Examiner — Jean M Corrielus
(74) Attorney, Agent, or Firm — Harrity & Harrity, LLP (57) ABSTRACT In one implementation, a method is described for identifying candidate query refinements for a given query from past queries submitted by one or more users. The method includes generating from the candidate query refinements, term occurrence scores for terms in the candidate query refinements indicating frequency of the terms within the candidate query refinements. The method further includes calculating query refinement scores for the candidate query refinements of the given query using the term occurrence scores. The method further includes storing data associating the query refinement scores with the candidate query refinements for use in selecting from among the candidate query refinements for the given query.

21 Claims, 7 Drawing Sheets

SEARCH QUERY SUGGESTIONS

BACKGROUND OF THE INVENTION

The present disclosure relates to query processing. In particular, it relates to identifying search query suggestions.

Information retrieval systems, such as Internet search engines, are responsive to a user's query to retrieve information about accessible resources such as Web pages, images, text documents and multimedia content. A search engine may use a variety of statistical measures to determine the relevance of the resources to the user's query.

For a variety of reasons, a user may have difficulty formulating a query that accurately represents the user's information need. For example, a user unfamiliar with the space of information about a particular topic may submit an initial query as a starting point for exploring the topic. However, this initial query may be ambiguous, too broad or too specific to yield high quality search results. In addition, a user unfamiliar with the language of the resources being searched may also use unconventional or even incorrect query terms.

In such a case, the user may have to enter a number of different queries about the same topic before reaching resources that are of interest to the user. The user's queries may include variations in the specificity or breadth of the query terms, variations in the number of terms, and variations in the order of the terms. Refining the search can be a time-consuming experience for the user.

SUMMARY OF THE INVENTION

In one implementation, a method is described for identifying candidate query refinements for a given query from past queries submitted by one or more users. The method includes generating from the candidate query refinements, term occurrence scores for terms in the candidate query refinements indicating frequency of the terms within the candidate query refinements. The method further includes calculating query refinement scores for the candidate query refinements of the given query using the term occurrence scores. The method further includes storing data associating the query refinement scores with the candidate query refinements for use in selecting from among the candidate query refinements for the given query.

Other implementations may include a non-transitory computer readable storage medium storing computer instructions executable by a processor to perform a method as described above. Yet another implementation may include a system including memory and one or more processors operable to execute instructions, stored in the memory, to perform a method as described above.

These and other implementations can each optionally include one or more of the following features. The method can further include calculating query refinement popularity scores for the candidate query refinements indicating frequency of the candidate query refinements in a log of the past queries. Data associating the query refinement scores with the candidate query refinements can then be stored for use along with the query refinement scores.

The method can further include generating a specific refinement count for a particular candidate refinement by counting how often a refinement from the given query to the particular candidate query refinement appears in the log. A global refinement count can be generated by counting how often a refinement from any query to the particular candidate query appears in the log. The specific refinement count and the global refinement count can then be used to generate the query refinement popularity score for the particular candidate query refinement.

The method can further include generating occurrence counts for terms in the candidate query refinements by counting how often the terms occur within the candidate query refinements. The occurrence counts can then be used to generate the term occurrence scores. In one implementation, the method further includes generating modified occurrence counts by adding a constant number to each of the occurrence counts. The modified occurrence counts can then be used to generate the term occurrence scores.

The method can further include calculating the query refinement score for a particular candidate query refinement using a sum of term occurrence scores of individual terms within the particular candidate query refinement. Calculating the query refinement can also include using the number of individual terms occurring in the particular candidate query refinement. The method can be further extended by the query refinement score for the particular candidate query refinement having a result described by:

$$QRS = \frac{\sum_{k=1}^{h} TOS(T_k)}{\sqrt{h}}$$

where QRS is the query refinement score for the particular candidate query refinement, and TOS(Tk) is the term occurrence score of the (h) individual terms (Tk) in the particular candidate query refinement.

The method can further include receiving the given query. One or more of the candidate query refinements can then be sent in response to the received given query.

Generating the term occurrence scores can further include segmenting the candidate query refinements into terms using term boundaries between individual terms.

Particular implementations of the subject matter described herein can identify suggested queries based upon terms within past query refinements made by users. These suggested queries can enable efficient refinement of search queries by users who may be unfamiliar with the information space about a particular topic.

Particular aspects of one or more implementations of the subject matter described in this specification are set forth in the drawings and the description below. Other features, aspects, and advantages of the subject matter will become apparent from the description, the drawings, and the claims.

DETAILED DESCRIPTION

A technology is described for identifying suggested queries for a given query based upon terms within past query refinements of the given query. The technology described herein includes identifying query refinements of the given query from a log in memory of past queries received from users.

A query refinement occurs when a user submits a first query, and then follows the first query with another query. For example, if a user submits the query "flower" followed by the query "flower garden", "flower garden" can be identified as a query refinement for "flower". A query refinement does not necessarily have to include the first query. For example, if a user submits a first query "London" followed by "England", "England" can be identified as a query refinement for "London". Query refinements thus indicate how users explore the information space about a particular topic.

The technology described herein includes using the identified query refinements to generate a list of unique candidate query refinements for the given query. In the list, each of the unique candidate query refinements is included only once.

Term occurrence scores are then generated for terms in the candidate query refinements. The term occurrence scores indicate frequency of the terms within the candidate query refinements for the given query.

The term occurrence scores are then used to calculate query refinement scores for the candidate query refinements. The query refinement scores are then stored for use by a subsequent computerized process in selecting among the candidate query refinements for the given query. For example, a subsequent computerized process may select one or more of the unique query refinements to be suggested queries for the given query. The subsequent process may be one that displays the suggested queries to the user.

Figure 1:
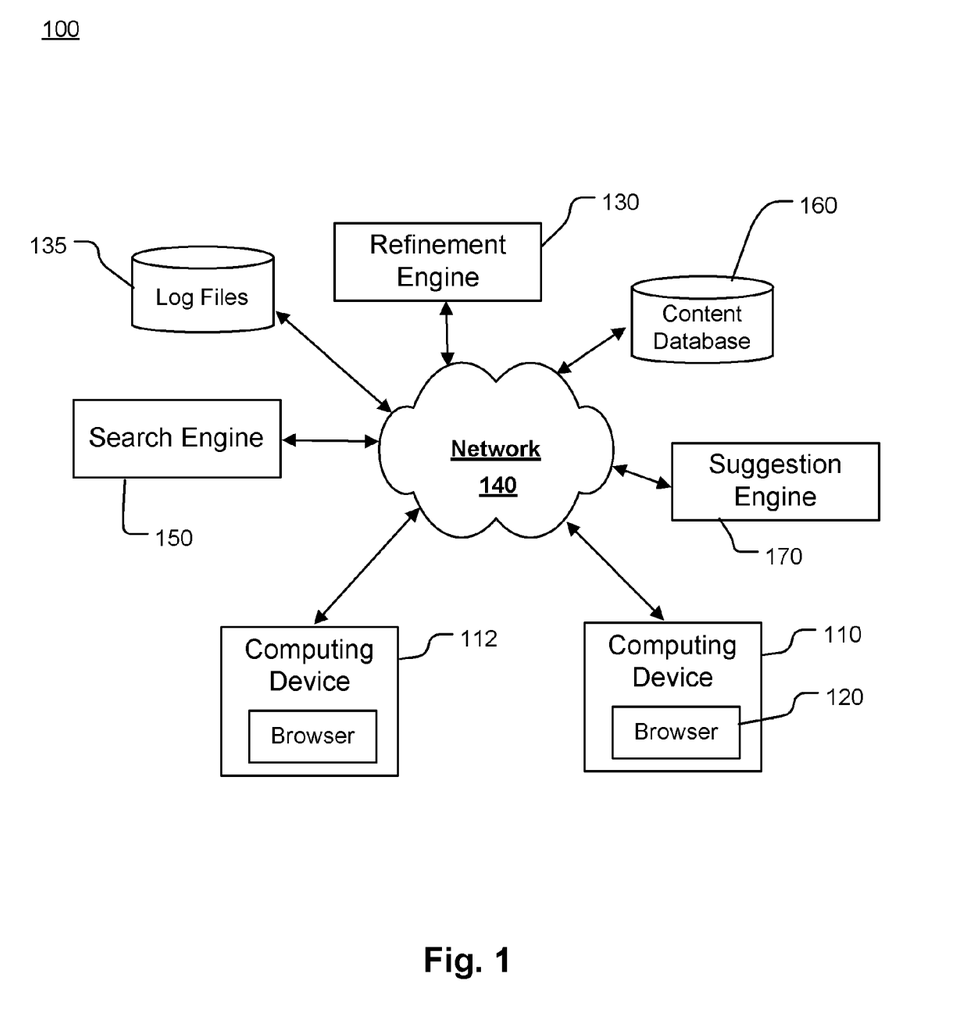
FIG. 1 illustrates a block diagram of an example environment in which selecting a suggested query for a given query can be used.

FIG. 1 illustrates a block diagram of an example environment 100 in which selecting suggested queries for a given query can be used. The environment 100 includes client computing devices 110, 112 and a search engine 150. The environment 100 also includes a communication network 140 that allows for communication between various components of the environment 100.

During operation, users interact with the search engine 150 through client computing devices 110, 112. The client computing devices 110, 112 and the search engine 150 each include memory for storage of data and software applications, a processor for accessing data and executing applications, and components that facilitate communication over the communication network 140. The computing devices 110, 112 execute applications, such as web browsers (e.g. web browser 120 executing on computing device 110), that allow users to formulate queries and submit them to the search engine 150. The search engine 150 receives queries from the computing devices 110, 112, and executes the queries against a content database 160 of available resources such as Web pages, images, text documents and multimedia content. The search engine 150 identifies content which matches the queries, and responds to the queries by generating search results which are transmitted to the computing devices 110, 112 in a form that can be presented to the users. For example, in response to a query from the computing device 110, the search engine 150 may transmit a search results web page to be displayed in the web browser 120 executing on the computing device 110.

The search engine 150 maintains log files 135 of user session query data associated with past queries received from users. The log files 135 may collectively be stored on one or more computers and/or storage devices. The log files 135 include search history information including a sequence of queries received from a user. For example, the search engine 150 may maintain an anonymous log of queries, not traceable to a particular user, or it may maintain a user specific log for the user's future reference, at the user's request.

The log files 135 are used by a refinement engine 130 to identify query refinements which potentially improve on a given query using the techniques described herein. The refinement engine 130 can be implemented in hardware, firmware, and/or software. The refinement engine 130 is described in more detail below with reference to FIGS. 3-7.

In response to a user's query, the search engine 150 may forward the user's query to a suggestion engine 170. The suggestion engine 170 includes memory for storage of data and software applications, a processor for accessing data and executing applications, and components that facilitate communication over the communication network 140. The suggestion engine 170 may provide the user's query to the refinement engine 150. In response to the user's query, the refinement engine 150 can then send one or more candidate query refinements and corresponding query refinement scores to the suggestion engine 170. The suggestion engine 170 can then use the query refinement scores to select one or more of the candidate query refinements to provide as suggested queries to the user.

These suggested queries provided by the suggestion engine 170 represent queries that the users may want to submit in addition to, or instead of, the queries actually typed or submitted. The suggested queries may for example be embedded within a search results web page to be displayed in the web browser executing on the user's computing device. Alternatively, the suggested queries may be displayed within a cascaded drop down menu of the search field of an application, such a web browser, executing on the user's computing device as the user is typing the query.

The network 140 facilitates communication between the various components in the environment 100. In one implementation, the network includes the Internet. The network 140 can also utilize dedicated or private communications links that are not necessarily part of the Internet. In one implementation, the network 140 uses standard communications technologies protocols, and/or inter-process communications techniques.

Many other configurations are possible having more or less components than the environment 100 shown in FIG. 1. For example, the environment 100 can include multiple search engines. The environment 100 can also include many more computing devices that submit queries to the search engines.

Figure 2:
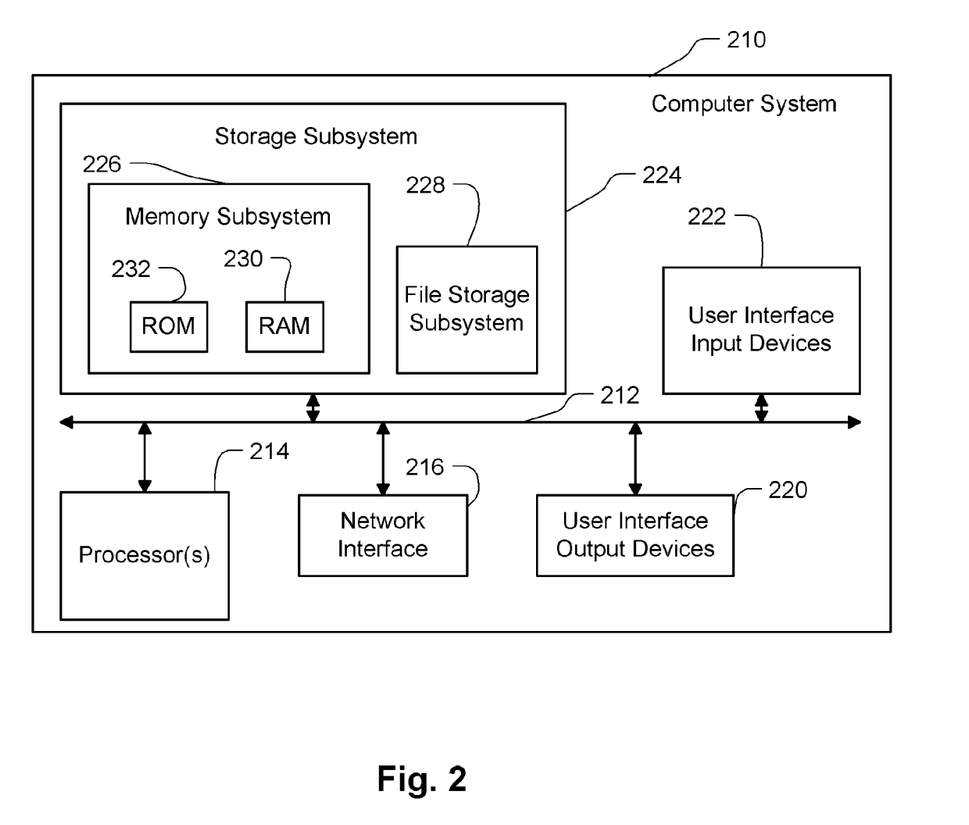
FIG. 2 is a block diagram of an example computer system.

FIG. 2 is a block diagram of an example computer system 210. Computer system 210 typically includes at least one processor 214 which communicates with a number of peripheral devices using bus subsystem 212. These peripheral devices may include a storage subsystem 224, comprising for example memory devices and a file storage subsystem, user interface input devices 222, user interface output devices 220, and a network interface subsystem 216. The input and output devices allow user interaction with computer system 210. Network interface subsystem 216 provides an interface to outside networks, including an interface to communication network 140, and is coupled using communication network 218 to corresponding interface devices in other computer systems. Communication network 218 may comprise many interconnected computer systems and communication links. These communication links may be wireline links, optical links, wireless links, or any other mechanisms for communication of information. While in one implementation, communication network 218 is the Internet, in other implementations, communication network 218 may be any suitable computer network.

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 210 or onto communication network 218.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 210 to the user or to another machine or computer system.

Storage subsystem 224 stores programming and data constructs that provide the functionality of some or all of the modules described herein, including the logic to identify query refinements for a given query according to the processes described herein. These software modules are generally executed by processor 214 alone or in combination with other processors.

Memory used in the storage subsystem can include a number of memories including a main random access memory (RAM) for storage of instructions and data during program execution and a read only memory (ROM) in which fixed instructions are stored. A file storage subsystem can provide persistent storage for program and data files, and may include a hard disk drive, a floppy disk drive along with associated removable media, a CD-ROM drive, an optical drive, or removable media cartridges. The databases and modules implementing the functionality of certain implementations may be stored by file storage subsystem in the storage subsystem 224, or in other machines accessible by the processor.

Bus subsystem 212 provides a mechanism for letting the various components and subsystems of computer system 210 communicate with each other as intended. Although bus subsystem 212 is shown schematically as a single bus, alternative implementations of the bus subsystem may use multiple busses.

Computer system 210 can be of varying types including a workstation, server, computing cluster, blade server, server farm, or any other data processing system or computing device. Due to the ever-changing nature of computers and networks, the description of computer system 210 depicted in FIG. 2 is an example for purposes of illustrating some implementations. Many other configurations of computer system 210 are possible having more or less components than the computer system depicted in FIG. 2.

Figure 3:
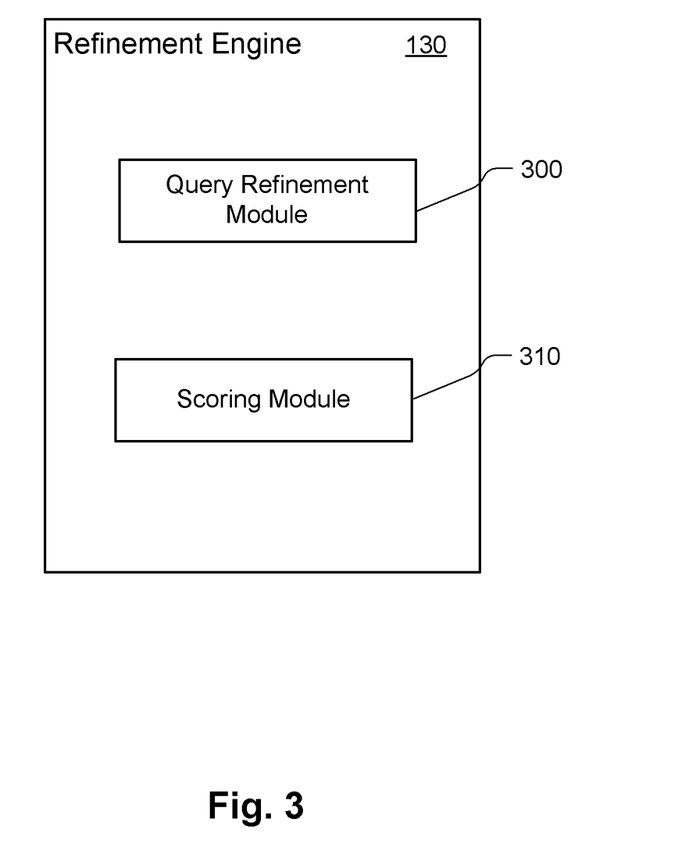
FIG. 3 is a block diagram illustrating example modules within the refinement engine in accordance with one implementation.

FIG. 3 is a block diagram illustrating example modules within the refinement engine 130 in accordance with one implementation. In FIG. 3, the refinement engine 130 includes a query refinement module 300 and a scoring module 310. Some implementations may have different and/or additional modules than those shown in FIG. 3. Moreover, the functionalities can be distributed among the modules in a different manner than described here. In addition, in some implementations, the refinement engine 130 (and/or the suggestion engine 170) can be included in the search engine 150.

The query refinement module 300 analyzes the log files 135 to identify query refinements for a given query. The techniques for determining whether one query is a query refinement of another query can vary from implementation to implementation. For example, in one implementation a subsequent query submitted within a specified period of time (e.g. 20 minutes) after another query is considered a query refinement. Alternatively, other techniques may be used. For example, in another implementation, a subsequent query which includes text from an earlier query may be considered a query refinement. In such an example, a subsequent query "miami, florida" may be considered a query refinement of an earlier query "florida" because it includes the text "florida". In yet another implementation, a particular query which co-occurs over a number of documents, such as html web pages, with another query may be considered a query refinement.

The query refinement module 300 aggregates the query refinements for the given query over the log files 135. Potential query refinements from the given query that do not appear more than a threshold number of times may be filtered out. The query refinement module 300 then uses the aggregated query refinements to generate a list of unique candidate query refinements for the given query. In this list, each of the candidate query refinements is included only once. The list of candidate query refinements for the given query are stored in a candidate query refinement list or other data structure maintained by the query refinement module 300.

The query refinement module 300 may also produce additional refinement statistics about the candidate query refinements. The refinement statistics may include query refinement popularity scores indicating frequency of the candidate query refinements in the log. In one implementation, the refinement popularity scores are the refinement rates for the candidate query refinements. The refinement rate of a particular candidate query refinement is given by a specific refinement count of the particular candidate query refinement, divided by a global refinement count of the particular candidate query refinement. The specific refinement count is generated by counting how often a refinement from the given query to the particular candidate query appears in the log. The global refinement count is generated by counting how often a refinement from any query to the particular candidate query appears in the log. In other words, for a given query Q1 and a particular candidate query refinement Q2, the refinement rate $R(Q2|Q1)$ is the number of times Q2 is a query refinement for Q1, divided by the number of times Q2 is a query refinement for all queries. For example, query Q2 may occur as a query refinement for query Q1 a total of 200 times, and Q2 may appear as a query refinement across all queries a total of 400 times. Thus, in this example, the refinement rate $R(Q2|Q1)$ is 200/400, or 0.5.

The scoring module 310 uses the list of candidate query refinements for the given query to generate term occurrence scores for terms in the candidate query refinements. The term occurrence score for a particular term indicates how often that particular term occurs within the list of candidate query refinements. The term occurrence scores are stored in an occurrence table or other data structured maintained by the scoring module 310.

In some implementations, a model is used to determine the term occurrence scores. In the model, each candidate query refinement is represented as an unordered collection of individual terms. The individual terms may for example be identified using white spaces. In some implementations, normalization processes such as stemming, the removal of punctuation, and the conversion of capital letters into lower case letters may also be applied to normalize the terms in the candidate query refinements.

The scoring module 310 computes occurrence counts for each of the individual terms by counting the number of times the individual terms occur within the list of candidate query refinements. In one implementation, the scoring module 310 calculates the term occurrence scores using the following equation:

$$TOS(T_j) = \frac{\text{Occurrence}(T_j)}{\sum_{i=1}^{n} \text{Occurrence}(T_i)} \cdot 100 \qquad \text{(Eq. 1)}$$

where $TOS(T_j)$ is the term occurrence score for term $T_j$, Occurrence(T) is the occurrence count of term $T_j$ within the list of candidate query refinements, and Occurrence($T_i$) is the occurrence count for each of the (n) terms within the list of candidate query refinements.

Alternative implementations may use other techniques for calculating the term occurrence scores. For example, in another implementation the term occurrence scores are calculated using the following equation:

$$TOS(T_j) = \frac{\frac{\text{Occurrence}(T_j)}{\sum_{i=1}^{n} \text{Occurrence}(T_i)} \cdot 100 \cdot cap}{\frac{\text{Occurrence}(T_j)}{\sum_{i=1}^{n} \text{Occurrence}(T_i)} \cdot 100 + cap - 1} \qquad \text{(Eq. 2)}$$

where (cap) is a constant number. In some embodiments, a constant number (x) is added to the occurrence count of each of the (n) different terms, prior to using (Eq. 2) above. Adding (x) forms a modified occurrence count for each of the (n) different terms. This has the effect of smoothing the occurrence counts, by reducing the difference between occurrence counts of different terms. Smoothing can be helpful in instances where the occurrence counts of certain terms may be too small, i.e., less than a threshold occurrence count, to adequately represent the occurrence relationship between these terms. For example, if term A has an occurrence count of 2, and term B has an occurrence count 1, this sample size is so small that the 2:1 ratio may not be an accurate refinement measure of the difference between the terms. In such a case, adding a constant number (x) to the occurrence counts of terms A and B can be used to modify the ratio such that it approaches 1:1. In doing so, the noise associated with small sample sizes can be reduced. In contrast, if term A has an occurrence count of 20,000 and term B has an occurrence count 10,000, this sample size is large enough that the 2:1 ratio is likely an accurate refinement measure between these terms. In such a case, adding a constant number (x) such as 5 to the occurrence counts of terms A and B changes the ratio only slightly.

In some embodiments, the term occurrence score of a particular term may be calculated based on the relative occurrence count of the particular term. For example, if (Eq. 1) is below a threshold value such as 1, the term occurrence score for the particular term may be assigned a value of 1. If the (Eq. 1) is above the threshold, then (Eq. 2) may be used to calculate the term occurrence score.

The scoring module 310 then calculates the query refinement scores for the candidate query refinements using the term occurrence scores. In some implementations, the query refinement score is calculated based on a sum of the term occurrence scores of the individual terms within the particular candidate query refinement. In one implementation, the query refinement scores are calculated using the following equation:

$$QRS(Q_m) = \frac{\sum_{k=1}^{h} TOS(T_k)}{\sqrt{h}} \qquad \text{(Eq. 3)}$$

where $QRS(Q_m)$ is the query refinement score for candidate query refinement $Q_m$ in the list of candidate query refinements, and $TOS(T_k)$ is the term occurrence score for each of the (h) different terms $T_k$ in the candidate query refinement $Q_m$.

Alternative implementations may use other techniques for calculating the query refinement scores. For example, in another implementation the query refinement scores are calculated using the following equation:

$$QRS(Q_m) = a \cdot \frac{\sum_{k=1}^{h} TOS(T_k)}{\sqrt{h}} + b \cdot R(Q_m | Q_g) \qquad \text{(Eq. 4)}$$

where $R(Q_m|Q_g)$ is the refinement rate of candidate query refinement $Q_m$ for given query $Q_g$, and (a) and (b) are constant weighting values.

Figure 4:
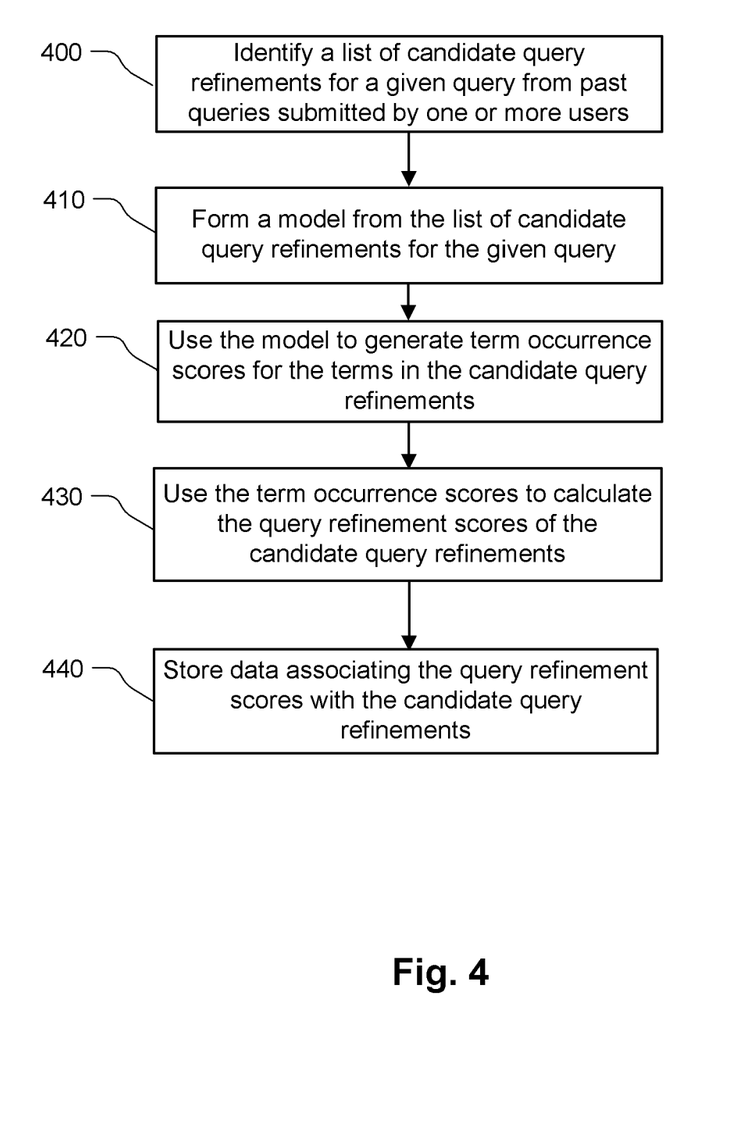
FIG. 4 is a flow chart illustrating an example process for identifying query refinements for a given query.

FIG. 4 is a flow chart illustrating an example process for calculating query refinement scores for a list of candidate query refinements of a given query. Other implementations may perform the steps in different orders and/or perform different or additional steps than the ones illustrated in FIG. 4. For convenience, FIG. 4 will be described with reference to a system of one or more computers that performs the process. The system can be, for example, the refinement engine 130 described above with reference to FIG. 1.

Figure 5:
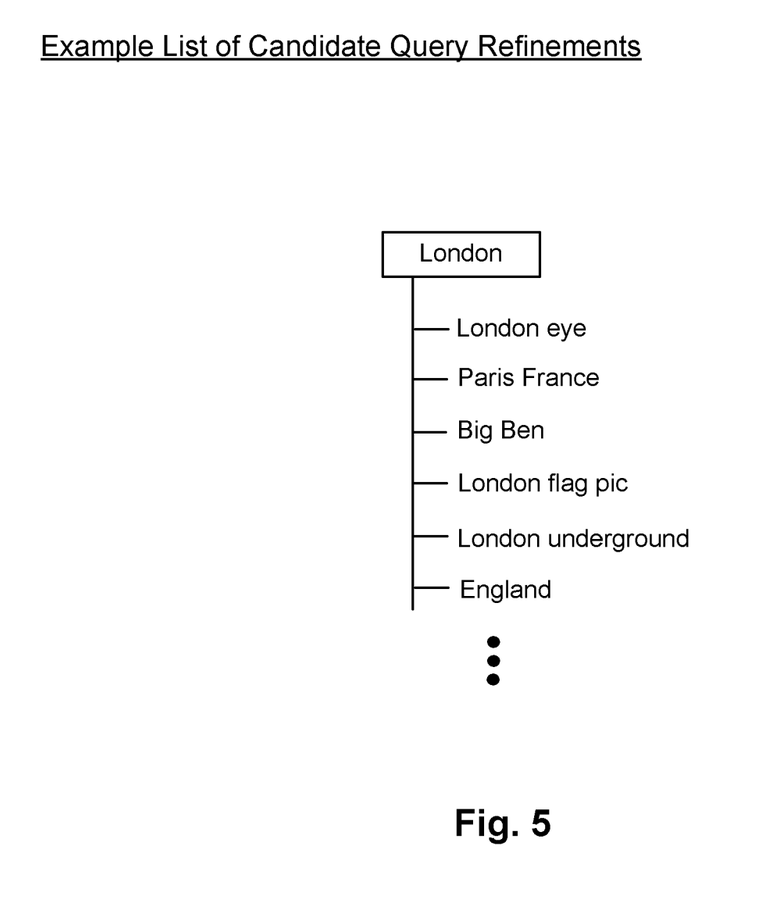
FIG. 5 illustrates an example partial list of query refinements for the query "London".

In step 400, the system identifies a list of candidate query refinements for the given query from the log files 135. FIG. 5 illustrates an example of a partial list of candidate query refinements for the query "London". In the example in FIG. 5, the partial list of candidate query refinements for the query "London" include "London eye", "Paris France", "Big Ben", "London flag pic", "London underground" and "England".

Referring back to FIG. 4, at step 410, the system forms a model from the list of candidate query refinements. In this example, the model represents each candidate query refinement as an unordered collection of individual terms. Each candidate query refinement is separated into terms by identifying the term boundaries between individual terms. A term boundary can be for example a white space. In some implementations, punctuation may also be considered to be a term boundary. Other segmentation techniques can be used.

At step 420, the system uses the model to produce term occurrence scores for the terms in the candidate query refinements. In this example, the system computes occurrence counts for each of the individual terms by counting the number of time each the individual terms occurs within the list of candidate query refinements. The system then calculates the term occurrence scores using for example (Eq. 1) or (Eq. 2) described above. Alternatively, other equations may be used. The system stores the occurrence counts for each of the individual terms in an occurrence table or other data structure.

In some implementations, one or more additional signals may be used to compute the final term occurrence scores. In one implementation, a second model formed from search results associated with the given query is used to compute the final term occurrence scores. For example, in an image search of the given query, a set of the most highly ranked images may be selected. Secondary term occurrence scores may then be calculated for terms in labels associated with the images in the set. These secondary term occurrence scores indicate frequency of the terms within the labels of the images in the set. The final term occurrence scores may then for example be calculated as a weighted average of the term occurrence scores of terms in the candidate query refinements, and the secondary term occurrence scores of the terms within the labels of the images in the set.

Figure 6:
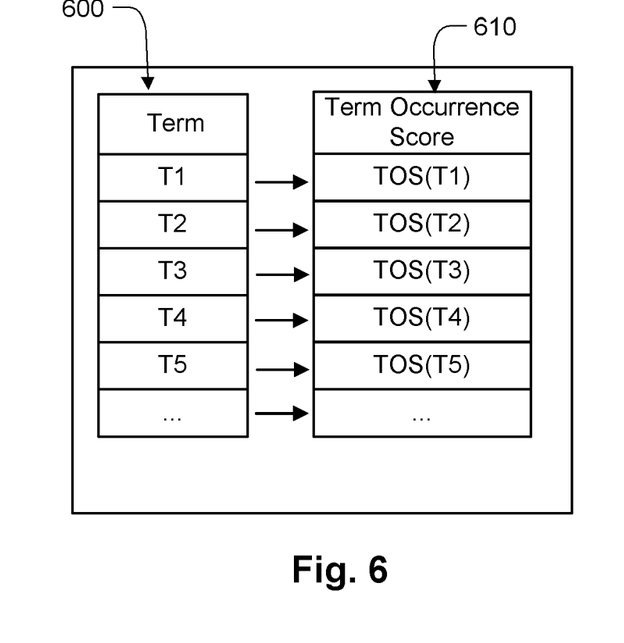
FIG. 6 illustrates an example occurrence score table maintained by the refinement engine for a list of query refinements for a particular query.

FIG. 6 illustrates an example occurrence table generated for the terms in the list of candidate query refinements. The leftmost column 600 contains the individual terms (e.g. T1, T2, T3 . . . ) in the list of candidate query refinements. The column 610 labeled "Term Occurrence Score" contains the term occurrence score for each individual term.

Returning back to FIG. 4, at step 430, the system uses the term occurrence scores to calculate the query refinement scores of the candidate query refinements. At step 440, the system stores data associating the query refinement scores with the candidate query refinements in a refinement score table or other data structure associated with the given query.

Figure 7:
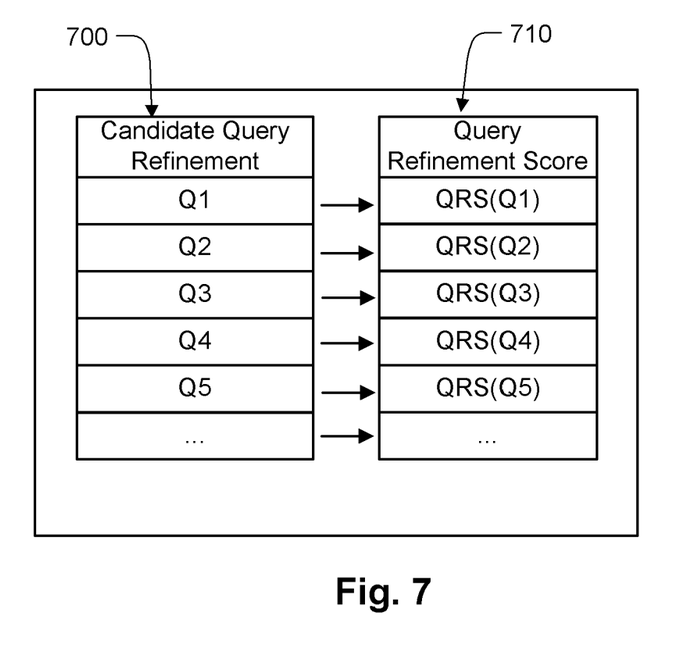
FIG. 7 illustrates an example refinement score table maintained by the refinement engine for a list of query refinements for a particular query.

FIG. 7 illustrates an example refinement score table maintained by the refinement engine for a list of query refinements of a particular query. The leftmost column 700 contains the candidate query refinements (e.g. Q1, Q2, Q3 . . . ) in the list. The column 710 labeled "Query Refinement Score" contains the query refinement score for each candidate query refinement.

To aid in the understanding of certain processes described herein, an example for calculating query refinement scores. In this example, the queries "flower image", "rose flower" and "garden" make up the list of candidate query refinements for the query "flower". Thus, using a model for this example results in the following occurrence counts for each of the individual terms:

| Term | Occurrence Count |
| --- | --- |
| flower | 2 |
| image | 1 |
| rose | 1 |
| garden | 1 |

In this example, the term occurrence scores are calculated using (Eq. 1) above. Thus, in this example the term occurrence score of the term "flower" is given as the occurrence count of "flower", divided by the sum of the occurrence counts of all the terms. In this example, the term occurrence score of the term "flower" is 2/5, or 0.4. The term occurrence scores for the other terms can be calculated in a similar manner. In this example, this results in the following term occurrence score table:

| Term | Term Occurrence Score |
| --- | --- |
| flower | 0.4 |
| image | 0.2 |
| rose | 0.2 |
| garden | 0.2 |

In this example, the query refinement scores are calculated using (Eq. 3) above. Thus, in this example, the query refinement score for "flower image" is given as the sum of the term occurrence scores of "flower" and "image", divided by the number of individual terms in "flower image" (i.e., 2). Thus, in this example, the query refinement score for "flower image" is given as $(0.4+0.2)/\sqrt{2}=0.424$. The query refinement scores for the other candidate query refinements in the list can be calculated in a similar manner. In this example, this results in the following query refinement score table:

| Candidate Query Refinement | Query Refinement Score |
| --- | --- |
| flower image | 0.424 |
| rose flower | 0.424 |
| garden | 0.2 |

As described above, data associating the query refinement scores with the candidate query refinements are stored for use by a subsequent process in selecting among the candidate query refinements for the given query. For example, a subsequent process may select one or more of the unique query refinements to be suggested queries for the given query. This process may be one that provides or displays the suggestions to a client device.

For example, the suggestion engine 170 may provide a user's query from the search engine to the refinement engine 150. In response, the refinement engine 150 can then send one or more candidate query refinements and corresponding query refinement scores for the user's query to the suggestion engine 170. The suggestion engine 170 can then use the query refinement scores to select one or more of the candidate query refinements to provide as suggested queries to the user.

In some implementations, the query refinement scores and one or more additional signals may be used by the suggestion engine 170 to compute the final query refinement scores for the candidate query refinements. The final query refinement scores may for example be a weighted average of the query refinement score computed by the refinement engine 130 and the additional signals.

Figure 8A:
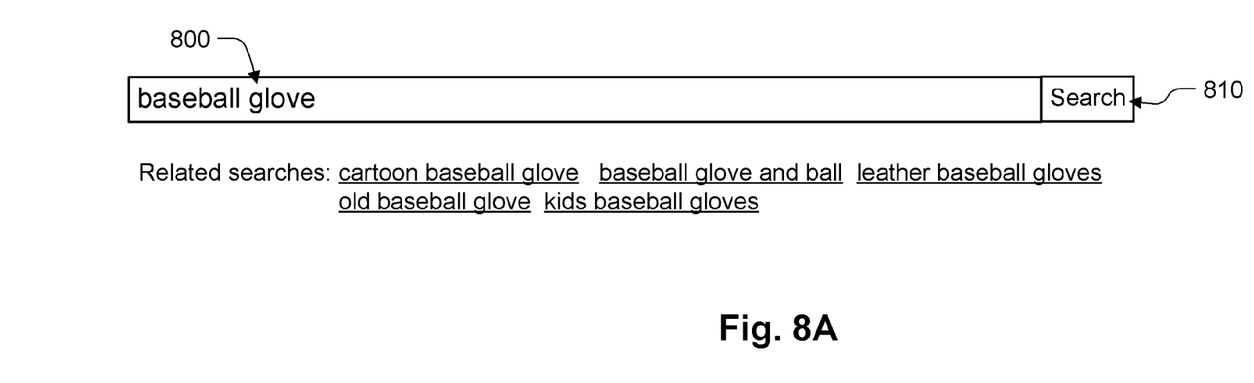
FIGS. 8A and 8B are screen shots illustrating example environments that can be used to provide suggested queries to a user.

FIGS. 8A and 8B are screen shots illustrating example environments that can be used to provide suggested queries to a user. In FIG. 8A, the partial screen shot includes a search field representation 800 and a search button representation 810. In this example, when the user submits the query "baseball glove", the suggested queries are embedded within the search results web page as "related searches". In this example, the suggested queries include "cartoon baseball glove", "baseball glove and ball", "leather baseball gloves", "old baseball glove" and "kids baseball gloves". The user may then select one of the embedded suggested queries to submit for execution by the search engine 150.

Figure 8B:
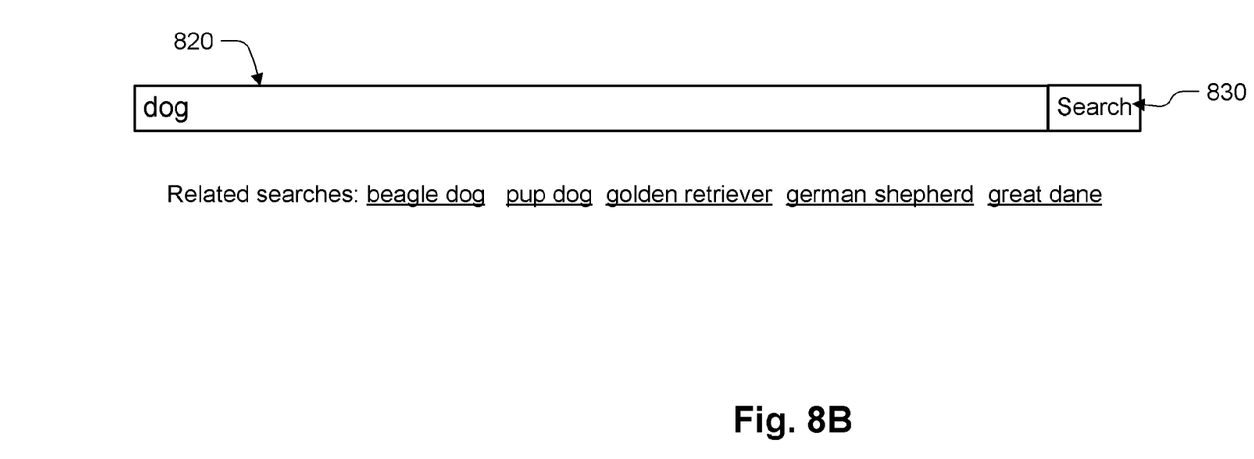

In FIG. 8B, the partial screen shot includes a search field representation 820 and a search button representation 830. In this example, when the user submits the query "dog", suggested queries are embedded within the search results web page as "related searches". In this example, the suggested queries include "beagle dog", "pug dog", "golden retriever", "german shepherd" and "great dane". The user may then click on one of the embedded suggested queries to submit the selected suggested query to the select one of the embedded suggested queries to submit for execution by the search engine 150.

While the present disclosure is described by reference to particular implementations and examples detailed above, it is understood that these examples are intended in an illustrative rather than in a limiting sense. Computer-assisted processing is implicated in the described implementations. Accordingly, the present disclosed technologies may be embodied in methods for identifying query refinements for a given query, systems including logic and resources to identify query refinements for a given query, systems that take advantage of computer-assisted methods for identifying query refinements for a given query, media impressed with logic to identify query refinements for a given query, e.g. non-transitory computer products to storing instructions to identify query refinements for a given query, data streams impressed with logic to identify query refinements for a given query, or computer-accessible services that carry out computer-assisted methods for identifying query refinements for a given query. It is contemplated that modifications and combinations will readily occur to those skilled in the art, which modifications and combinations will be within the scope of the following claims.

I claim as follows:

1. A method including:
   identifying, by a device, one or more candidate query refinements for a query based on one or more previous queries submitted by one or more users;
   generating, by the device and based on the one or more candidate query refinements, one or more term occurrence scores associated with one or more respective terms in the one or more candidate query refinements,
      the one or more term occurrence scores indicating a frequency of the one or more respective terms in the one or more candidate query refinements;
   calculating, by the device and based on the one or more term occurrence scores, a respective query refinement score for each of the one or more candidate query refinements;
   generating, by the device and for a particular candidate query refinement of the one or more candidate query refinements, a first refinement count,
      the first refinement count being based on a frequency of occurrence of the particular candidate query refinement in a log;
   generating, by the device and for the particular candidate query refinement, a second refinement count,
      the second refinement count being based on a frequency of occurrence of another candidate query refinement, of the one or more candidate query refinements, in the log;
   generating, by the device and based on the first refinement count and the second refinement count, a query refinement popularity score for the particular candidate query refinement; and
   storing, by the device, information associating the respective query refinement score with each of the one or more candidate query refinements and the query refinement popularity score with the particular candidate query refinement for use in selecting among the one or more candidate query refinements for the query.

2. The method of claim 1, further including:
   generating first occurrence counts for terms in the one or more candidate query refinements by counting how often the terms occur within the one or more candidate query refinements; and
   using the first occurrence counts to generate the one or more term occurrence scores.

3. The method of claim 2, further including:
   generating second occurrence counts by adding a particular value to each of the first occurrence counts; and
   using the second occurrence counts to generate the one or more term occurrence scores.

4. The method of claim 1, further including:
   generating, for the particular candidate query refinement, the respective query refinement score using:
      a sum of term occurrence scores of individual terms within the particular candidate query refinement, and
      a number of individual terms within the particular candidate query refinement.

5. The method of claim 4, where the query refinement score for the particular candidate query refinement has a result described by:

$$QRS = \frac{\sum_{k=1}^{h} TOS(T_k)}{\sqrt{h}}$$

where QRS is the query refinement score for the particular candidate query refinement, and $TOS(T_k)$ is the term occurrence score of the (h) individual terms $(T_k)$ in the particular candidate query refinement.

6. The method of claim 1, further including:
   receiving the query; and
   sending, based on receiving the query, the particular candidate query refinement.

7. The method of claim 1, where, when generating the one or more term occurrence scores, the method includes:
   segmenting the one or more candidate query refinements into terms using term boundaries between individual terms of the one or more respective terms.

8. A non-transitory computer readable storage medium storing computer instructions which, when executed by a processor, cause the processor to:
   identify one or more candidate query refinements for a query based on one or more previous queries submitted by one or more users;
   generate, based on the one or more candidate query refinements, one or more term occurrence scores associated with one or more respective terms in the one or more candidate query refinements,
      the one or more term occurrence scores indicating a frequency of the one or more respective terms in the one or more candidate query refinements;
   calculate, based on the one or more term occurrence scores, a respective query refinement score for each of the one or more candidate query refinements;
   generate, for a particular candidate query refinement of the one or more candidate query refinements, a first refinement count,
      the first refinement count being based on a frequency of occurrence of the particular candidate query refinement in a log;
   generate, for the particular candidate query refinement, a second refinement count, the second refinement count being based on a frequency of occurrence of another candidate query refinement, of the one or more candidate query refinements, in the log;

generate, based on the first refinement count and the second refinement count, a query refinement popularity score for the particular candidate query refinement; and store information associating the respective query refinement score with each of the one or more candidate query refinements and the query refinement popularity score with the particular candidate query refinement for use in selecting among the one or more candidate query refinements for the query.

9. The non-transitory computer readable storage medium of claim 8, where the one or more instructions further include:

one or more instructions to generate first occurrence counts for terms in the one or more candidate query refinements by counting how often the terms occur within the one or more candidate query refinements; and one or more instructions to use the first occurrence counts to generate the one or more term occurrence scores.

10. The non-transitory computer readable storage medium of claim 9, where the one or more instructions further include:

one or more instructions to generate second occurrence counts by adding a particular value to each of the first occurrence counts; and one or more instructions to use the second occurrence counts to generate the one or more term occurrence scores.

11. The non-transitory computer readable storage medium of claim 8, where the one or more instructions further include:

one or more instructions to generate, for the particular candidate query refinement, the respective query refinement score using:

a sum of term occurrence scores of individual terms within the particular candidate query refinement, and a number of individual terms within the particular candidate query refinement.

12. The non-transitory computer readable storage medium of claim 11, where the query refinement score for the particular candidate query refinement has a result described by:

$$QRS = \frac{\sum_{k=1}^{h} TOS(T_k)}{\sqrt{h}}$$

where QRS is the query refinement score for the particular candidate query refinement, and $TOS(T_k)$ is the term occurrence score of the (h) individual terms ($T_k$) in the particular candidate query refinement.

13. The non-transitory computer readable storage medium of claim 8, where the one or more instructions further include:

one or more instructions to receive the query; and one or more instructions to send, based on receiving the query, the particular candidate query refinement.

14. The non-transitory computer readable storage medium of claim 8, where the one or more instructions to generate the one or more term occurrence scores include:

one or more instructions to segment the one or more candidate query refinements into terms using term boundaries between individual terms of the one or more respective terms.

15. A device including:

a memory storing instructions; and one or more processors to execute the instructions to:

identify one or more candidate query refinements for a query based on one or more previous queries submitted by one or more users;

generate, based on the one or more candidate query refinements, one or more term occurrence scores associated with one or more respective terms in the one or more candidate query refinements, the one or more term occurrence scores indicating a frequency of the one or more respective terms within in the one or more candidate query refinements;

calculate, based on the one or more term occurrence scores, a respective query refinement score for each of the one or more candidate query refinements;

generate, for a particular candidate query refinement of the one or more candidate query refinements, a first refinement count, the first refinement count being based on a frequency of occurrence of the particular candidate query refinement in a log;

generate, for the particular candidate query refinement, a second refinement count, the second refinement count being based on a frequency of occurrence of another candidate query refinement, of the one or more candidate query refinements, in the log;

generate, based on the first refinement count and the second refinement count, a query refinement popularity score for the particular candidate query refinement; and store information associating the respective query refinement score with each of the one or more candidate query refinements and the query refinement popularity score with the particular candidate query refinement for use in selecting among the one or more candidate query refinements for the given query.

16. The device of claim 15, where the one or more processors are further to:

generate first occurrence counts for terms in the one or more candidate query refinements by counting how often the terms occur within the one or more candidate query refinements; and use the first occurrence counts to generate the one or more term occurrence scores.

17. The device of claim 16, where the one or more processors are further to:

generate second occurrence counts by adding a particular value to each of the first occurrence counts; and use the second occurrence counts to generate the one or more term occurrence scores.

18. The device of claim 15, where the one or more processors are further to:

generate, for the particular candidate query refinement, the respective query refinement score using:

a sum of term occurrence scores of individual terms within the particular candidate query refinement, and a number of individual terms within the particular candidate query refinement.

19. The device of claim 18, where the query refinement score for the particular query refinement has a result described by:

$$QRS = \frac{\sum_{k=1}^{h} TOS(T_k)}{\sqrt{h}}$$

where QRS is the query refinement score for the particular candidate query refinement, and $TOS(T_k)$ is the term occurrence score of the (h) individual terms ($T_k$) in the particular candidate query refinement.

20. The device of claim 15, where the one or more processors are further to:
   receive the query; and
   send, based on receiving the query, the particular candidate query refinement.

21. The device of claim 15, where, when generating the one or more term occurrence scores, the one or more processors are further to:
   segment the one or more candidate query refinements into terms using term boundaries between individual terms of the one or more respective terms.

* * * * *

UNITED STATES PATENT AND TRADEMARK OFFICE
CERTIFICATE OF CORRECTION

| | | |
|---|---|---|
| PATENT NO. | : 8,515,985 B1 | Page 1 of 1 |
| APPLICATION NO. | : 13/168799 | |
| DATED | : August 20, 2013 | |
| INVENTOR(S) | : Yun Zhou | |

It is certified that error appears in the above-identified patent and that said Letters Patent is hereby corrected as shown below:

In the Claims

Please correct Claim 15 (Column 14, Line 12) to read as follows:

in the one or more candidate query refine-

Signed and Sealed this
Nineteenth Day of November, 2013

Teresa Stanek Rea
*Deputy Director of the United States Patent and Trademark Office*